(12) United States Patent
Huang et al.

(10) Patent No.: US 11,719,977 B2
(45) Date of Patent: Aug. 8, 2023

(54) LIGHT REFLECTING STRUCTURE, BACKLIGHT MODULE AND DISPLAY DEVICE

(71) Applicants: Radiant(Guangzhou) Opto-Electronics Co., Ltd, Guangdong (CN); Radiant Opto-Electronics Corporation, Kaohsiung (TW)

(72) Inventors: Hui-Yu Huang, Kaohsiung (TW); Hsiu-Yi Lai, Kaohsiung (TW); Shih-Cheng Hsiao, Kaohsiung (TW); Shu-An Tsai, Kaohsiung (TW); Pei-Ling Kao, Kaohsiung (TW); I-Cheng Liu, Kaohsiung (TW)

(73) Assignees: Radiant(Guangzhou) Opto-Electronics Co., Ltd, Guangdong (CN); Radiant Opto-Electronics Corporation, Kaohsiung (TW)

( * ) Notice: Subject to any disclaimer, the term of this patent is extended or adjusted under 35 U.S.C. 154(b) by 0 days.

(21) Appl. No.: 17/573,621

(22) Filed: Jan. 11, 2022

(65) Prior Publication Data
US 2022/0137459 A1    May 5, 2022

Related U.S. Application Data

(63) Continuation of application No. PCT/CN2020/120146, filed on Oct. 10, 2020.

(51) Int. Cl.
*G02F 1/13357* (2006.01)
(52) U.S. Cl.
CPC .. *G02F 1/133605* (2013.01); *G02F 1/133603* (2013.01)

(58) Field of Classification Search
CPC ................... G02F 1/133605; G02F 1/133603
See application file for complete search history.

(56) References Cited

U.S. PATENT DOCUMENTS 10,558,081 B2 *   2/2020   Sasaki ............... G02F 1/133611
10,595,367 B2 *   3/2020   Yamada .................. H01L 33/62
(Continued)

FOREIGN PATENT DOCUMENTS

CN         1846318 A      10/2006
CN       101069122 A      11/2007
(Continued)

OTHER PUBLICATIONS

Tawainese Search Report for Application (Year: 2021).*

*Primary Examiner* — Tracie Y Green
(74) *Attorney, Agent, or Firm* — CKC & Partners Co., LLC

(57) ABSTRACT

A light reflecting structure, a backlight module, and a display device are provided. The light reflecting structure is configured to reflect light emitted from plural light emitting units. The light reflecting structure includes a bottom portion and plural sidewall portions. The sidewall portions are erected on the bottom portion. The sidewall portions respectively and correspondingly surround the light-emitting units, and the light emitted from each of the light-emitting units can be directed to a light reflecting surface corresponding to each of the sidewall portions to be reflected outward. A distance P is defined between any two adjacent sidewall portions, and each of the sidewall portions has a height H1. The distance P and the height H1 satisfy a first inequality, and the first inequality is H1<P/2×tan θ. θ represents a complementary angle of a half light-intensity angle of each of the light-emitting units.

14 Claims, 4 Drawing Sheets

(56) References Cited

U.S. PATENT DOCUMENTS

| | | | | |
|---|---|---|---|---|
| 10,825,970 | B2* | 11/2020 | Hsieh | H01L 33/486 |
| 2013/0265744 | A1* | 10/2013 | Park | F21K 9/60 |
| | | | | 362/97.3 |
| 2017/0250327 | A1* | 8/2017 | Hsieh | H01L 33/60 |
| 2021/0263380 | A1* | 8/2021 | Chen | G02F 1/133605 |
| 2022/0035093 | A1* | 2/2022 | Chang | G02B 6/0038 |

FOREIGN PATENT DOCUMENTS

| | | |
|---|---|---|
| CN | 201348203 Y | 11/2009 |
| CN | 102287722 A | 12/2011 |
| CN | 103548160 A | 1/2014 |
| CN | 103548161 A | 1/2014 |
| CN | 103765618 A | 4/2014 |
| CN | 109698189 A | 4/2019 |
| TW | 201116900 A | 5/2011 |
| TW | 201143165 A | 12/2011 |
| TW | 201244150 A | 11/2012 |
| TW | 201303442 A | 1/2013 |
| TW | 201305669 A | 2/2013 |
| TW | 201924098 A | 6/2019 |
| TW | M580691 U | 7/2019 |

* cited by examiner

LIGHT REFLECTING STRUCTURE, BACKLIGHT MODULE AND DISPLAY DEVICE

RELATED APPLICATIONS

This application is a continuation application of International Application No. PCT/CN2020/120146 filed on Oct. 10, 2020, which is incorporated herein by reference.

BACKGROUND

Field of Invention

The present disclosure relates to an optical film structure and its application. More particularly, the present disclosure relates to a light reflecting structure and its application on backlight modules and display devices.

Description of Related Art

Generally, a light source used for a direct type backlight module mainly includes a substrate and plural light-emitting diodes arranged on the substrate at equal intervals. Light produced from these light-emitting diodes can further be mixed by an optical film to form a surface light source.

However, refer to FIG. 1, FIG. 1 is a simulation diagram of light luminance of a backlight module using a conventional light source. As shown in the FIG. 1, since the light-emitting diodes are arranged at equal intervals, if the emitted light is not mixed uniformly, grid bright lines B1 will be readily produced between two adjacent light-emitting diodes, this will lead to non-uniform of the brightness of the appearance of the backlight module.

SUMMARY

Accordingly, an objective of the present disclosure is to provide a light reflecting structure, which not only can reflect and direct a portion of light emitted from light-emitting units, but also enable a portion of oblique light emitted from the adjacent light-emitting units to be mixed fully in order to increase the uniformity of emitted light of the whole light-emitting units.

According to the aforementioned objectives of the present disclosure, a light reflecting structure is provided. The light reflecting structure is configured to reflect light emitted from a plurality of light-emitting units. The light reflecting structure comprises a bottom portion and a plurality of sidewall portions. The sidewall portions are standing on the bottom portion, wherein the sidewall portions respectively and correspondingly surround at least one light-emitting unit, and the light emitted from each light-emitting unit can be directed to a reflecting surface corresponding to each of the sidewall portions to be reflected outward. There is a distance P being between any two adjacent sidewall portions, and each of the sidewall portions has a height H1, and wherein the distance P and the height H1 satisfy a first inequality, and the first inequality is: H1<P/2×tan θ. θ represents a complementary angle of a half light-intensity angle of each of the light-emitting units.

According to one embodiment of the present disclosure, the aforementioned distance P and the height H1 satisfy a second inequality, and the second inequality is:

$$H1 < \frac{P}{2} \times \tan(\theta - \theta').$$

θ' ranges from 5 degrees to 20 degrees, and includes end point values.

According to one embodiment of the present disclosure, the aforementioned θ is 30 degrees.

According to one embodiment of the present disclosure, the aforementioned sidewall portions are connected to each other through a plurality of junction portions, wherein each junction portion is a plane structure.

According to one embodiment of the present disclosure, the aforementioned sidewall portions are connected to each other through a plurality of junction portions, wherein each junction portion is a cambered structure.

According to one embodiment of the present disclosure, the sidewall portions are connected to each other through a plurality of junction portions, and the aforementioned bottom portion, the sidewall portions, and the junction portions are collectively formed an integrated structure, wherein each of the junction portions is a plane structure or a cambered structure.

According to one embodiment of the present disclosure, the each aforementioned reflecting surface is inclined relative to its corresponding light-emitting units along a direction away from the light-emitting units.

According to one embodiment of the present disclosure, the each aforementioned sidewall portion has a top portion. Any two of the reflecting surfaces of the adjacent sidewall portions are extended to form a virtual intersection. Wherein the location of the aforementioned top portion is lower than the location of the virtual intersection.

According to one embodiment of the present disclosure, the light field of the light emitted from each aforementioned light-emitting unit conforms to Lambertian distribution. The light emitted from each of the light-emitting units includes a first portion of light, and the first portion of light passes through the location above the top portion of the sidewall portion.

According to one embodiment of the present disclosure, the light emitted from the light-emitting units further includes a second portion of light. The second portion of light emits toward the sidewall portions, and is directed toward the location above the light-emitting unit after being reflected by the sidewall portion.

According to one embodiment of the present disclosure, an emitting angle of the aforementioned first portion of light at Lambertian light field ranges from 65 degrees to 80 degrees and from −65 degrees to −80 degrees, and includes end point values.

According to one embodiment of the present disclosure, another backlight module is provided. This backlight module comprises a light source, the aforementioned light reflecting structure, and at least one optical film. The light source includes a substrate and a plurality of light-emitting units arranged as arrays on the substrate. The aforementioned light reflecting structure is disposed on the substrate. The optical film is disposed above the light source and the light reflecting structure.

According to one embodiment of the present disclosure, there are a plurality of through holes at the bottom portion of the light reflecting structure, and the light-emitting units emit light toward the sidewall portions and at least one optical film through the through holes.

According to one embodiment of the present disclosure, another display device is provided. The display device comprises the aforementioned backlight module and a display panel. The display panel is disposed on the backlight module.

According to the aforementioned embodiments of the present disclosure, the light reflecting structures of the present embodiment is designed based on half-light intensity angles of the light-emitting units and the height and the distance of the sidewall portions. Therefore, the sidewall portions of the light reflecting structure can not only reflect a portion of light produced by the light-emitting units to emit upward, but also allow a portion of the light produced by the light-emitting unit to directly pass through the location above the top portion of the sidewall portions, thereby avoiding the formation of grid bright lines, and increasing the light emitting uniformity of the backlight module and display device.

BRIEF DESCRIPTION OF THE DRAWINGS

To illustrate more clearly the aforementioned and the other objectives, features, merits, and embodiments of the present invention, the description of the accompanying figures are as follows.

DETAILED DESCRIPTION

Figure 2:
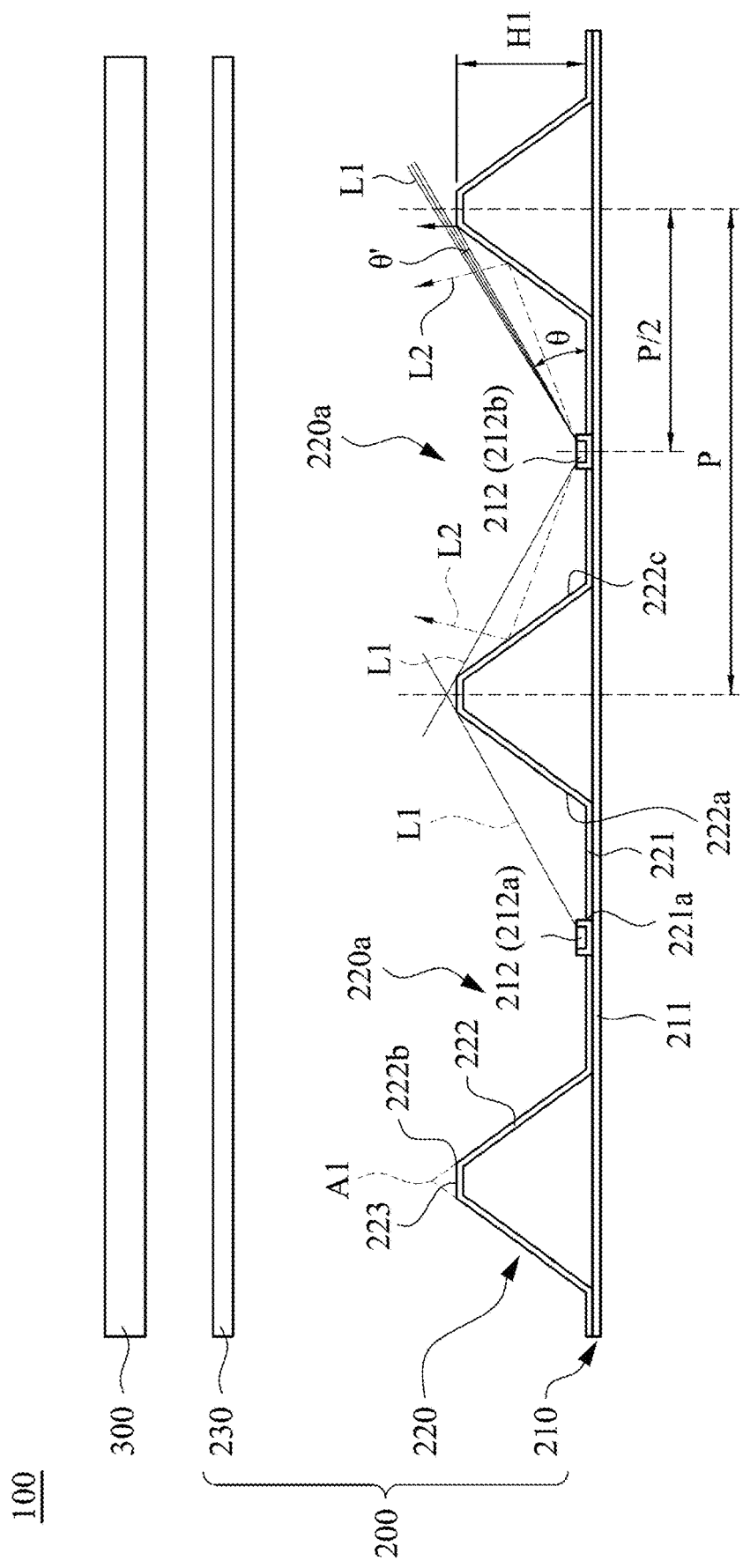
FIG. 2 is a schematic diagram of a display device in accordance with one embodiment of the present disclosure.

Refer to FIG. 2, FIG. 2 is a schematic diagram of a display device 100 in accordance with one embodiment of the present disclosure. The display device 100 of the present embodiment mainly comprises a backlight module 200 and a display panel 300, and the display panel 300 is disposed above the backlight module 200. The backlight module 200 mainly comprises a light source 210, a light reflecting structure 220, and at least one optical film 230. The light reflecting structure 220 is configured to reflect light emitted from the light source 210. The optical film 230 is disposed above the light source 210 and the light reflecting structure 220, and is configured to uniformize the light directly emitted from the light source 210 and the light emitted from the light source 210 which emits toward the light reflecting structure 220 and is reflected by the light reflecting structure 220.

As shown in FIG. 2, the light source 210 includes a substrate 211 and plural light-emitting units 212, in which the light-emitting units 212 are arranged as arrays on the substrate 211. In one example, each of the light-emitting units 212 can be referred to as a single light-emitting structure or a single light-emitting group. For example, a single light-emitting group is a group formed by arranging a plenty of single light-emitting structure together, and each light-emitting group is arranged on the substrate 211. The light reflecting structure 220 is disposed on the substrate 211 of the light source 210. The light reflecting structure 220 includes plural reflecting units 220a, and each reflecting unit 220a includes a bottom portion 221 and sidewall portions 222. The sidewall portions 222 are erected on the bottom portions 221, and the sidewall portions 222 respectively and correspondingly surround at least one light-emitting unit 212. In the embodiment as shown in FIG. 2, the light reflecting structure 220 can be a single sheet structure disposed on the substrate 211 of the light source 210. In other embodiments, the light reflecting structure 220 can also be directly formed on the substrate 211 of the light source 210. In the present disclosure, the light reflecting structure 220 of the present invention is not limited to the aforementioned embodiments, any structures which can be used as the light reflecting structure as long as they can generate reflection effect around the light-emitting unit 212. In an embodiment, the bottom portion 221 of each reflecting unit 220a has through holes 221a, and the number and the locations of the through holes 221a are correspond to the number and the locations of the light-emitting units 212. Therefore, each of the light-emitting unit 212 emits light through the corresponding through hole 221a toward the sidewall portions 222 and the optical film 230. Concretely speaking, each sidewall portion 222 has a reflecting surface (For example, a reflecting surface 222a and a reflecting surface 222c), and the reflecting surface 222a and the reflecting surface 222c are respectively inclined relative to their corresponding light-emitting unit 212 in the direction away from the light-emitting units 212. Therefore, the light emitted from each light-emitting unit 212 can be directed toward the reflecting surface 222a and the reflecting surface 222c of the corresponding sidewall portions 222, and further be reflected by the reflecting surface 222a and the reflecting surface 222c to be directed upward. Taking FIG. 2 as an example, light emitted from a light-emitting unit 212a can be directed to the light reflecting surface 222a, and be reflected by the light reflecting surface 222a to emit upward; light emitted from a light-emitting unit 212b can be directed to the light reflecting surface 222c, and be reflected by the light reflecting surface 222c to emit upward. Furthermore, the bottom portion 221 may also have a function of reflecting light, and can make the light which is emitted upward from the light-emitting units 212 and is reflected back by the optical film 230 be reflected again to emit upward.

Figure 1:
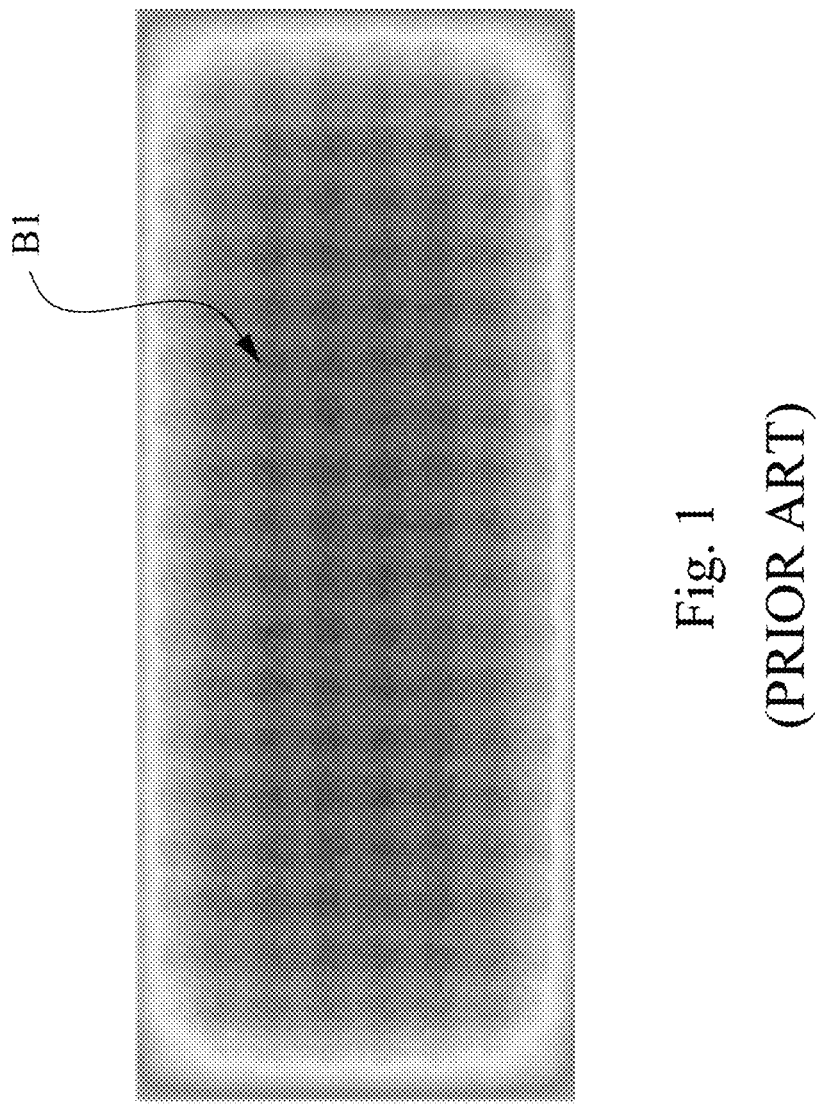
FIG. 1 shows a simulation diagram of light intensity of a backlight module using a conventional light source.

In an embodiment, the sidewall portions 222 of the reflecting units 220a are connected to each other by the plural junction portions 223, in which each junction portion 223 can be a plane structure or a cambered structure. The bottom portion 221, the sidewall portions 222, and the junction portions 223 of the light reflecting structure 220 collectively form an integrated structure. Concretely saying, each junction portion 223 is mainly connected between the top portions 222b of the adjacent sidewall portions 222, and by designing the junction portions 223 into a plane structure or a cambered structure which does not have any steeples, a portion of the light produced by the light-emitting units 212 can directly pass above the junction portions 223. More specifically, as shown in FIG. 2, if the reflecting surfaces (for example, the reflecting surface 222a and the reflecting surface 222c) of any two adjacent sidewall are imaginarily extended to intersect each other, a virtual intersection A1 is formed, and the location of the top portion 222b of the sidewall portion 222 is lower than the location of this virtual intersection A1. This means that the reflecting surface 222a and the reflecting surface 222c of the adjacent sidewall portions 222 do not extend to the virtual intersection A1 to intersect each other to form a steeple, they are connected to each other through a plane-shaped or a cambered plane-shaped junction portion 223 instead. Therefore, a portion of the light produced by the light-emitting units 212 can be directed obliquely through the locations above the top portions 222b of the sidewall portions 222, and will not be reflected by the reflecting surface 222a and the reflecting surface 222c. Contrarily, if the reflecting surface 222a and the reflecting surface 222c of the adjacent sidewall portions 222 directly extend to the virtual intersection A1 to form a steeple, the amount of light reflected by the top portions 222b of the sidewall portions 222 will increase, and further lead to the phenomenon of the grid bright lines B1 as shown in FIG. 1. Therefore, by using the design of non-steeple junction portions 223 to connect the two adjacent reflecting units 220a of the sidewall portions 222, the light passing through the location above the top portion 222b of the adjacent sidewall portions 222 can be mixed at the location around the virtual intersection A1 and pass through the optical film 230, thereby avoiding the phenomenon of the grid bright lines produced by the conventional backlight module and increasing the overall light uniformity of the backlight module 200.

In the present embodiment, there is a distance P between any two adjacent sidewall portions 222. Each sidewall portion has a height H1. The distance P and the height H1 satisfy a first inequality, the first inequality is:

$$H1 < \frac{P}{2} \times \tan\theta.$$

θ is a complementary angle of a half light-intensity angle of each light-emitting unit 212. Therefore, by limiting the height H1 of the top portion 222b of each sidewall portion 222, the height H1 of the junction portion 223 between the adjacent reflecting unit 220a can be ensured to be lower than the aforementioned design of the virtual intersection A1. In particular, the non-steeple design of the junction portions 223 can reduce the bright lines problem resulted from gathering and intersecting the light emitted from the two adjacent light-emitting units 212 at the location above the aforementioned virtual intersection A1. In some embodiments, the distance P and the height H1 may also satisfy a second inequality, the second inequality is:

$$H1 < \frac{P}{2} \times \tan(\theta - \theta').$$

θ' ranges from 5 degrees to 20 degrees, and includes the end point values. θ' is an emitting angle of the portion of the light emitted by each light-emitting unit 212 toward the location above the top portion 222b of the corresponding sidewall portion 222.

Figure 3:
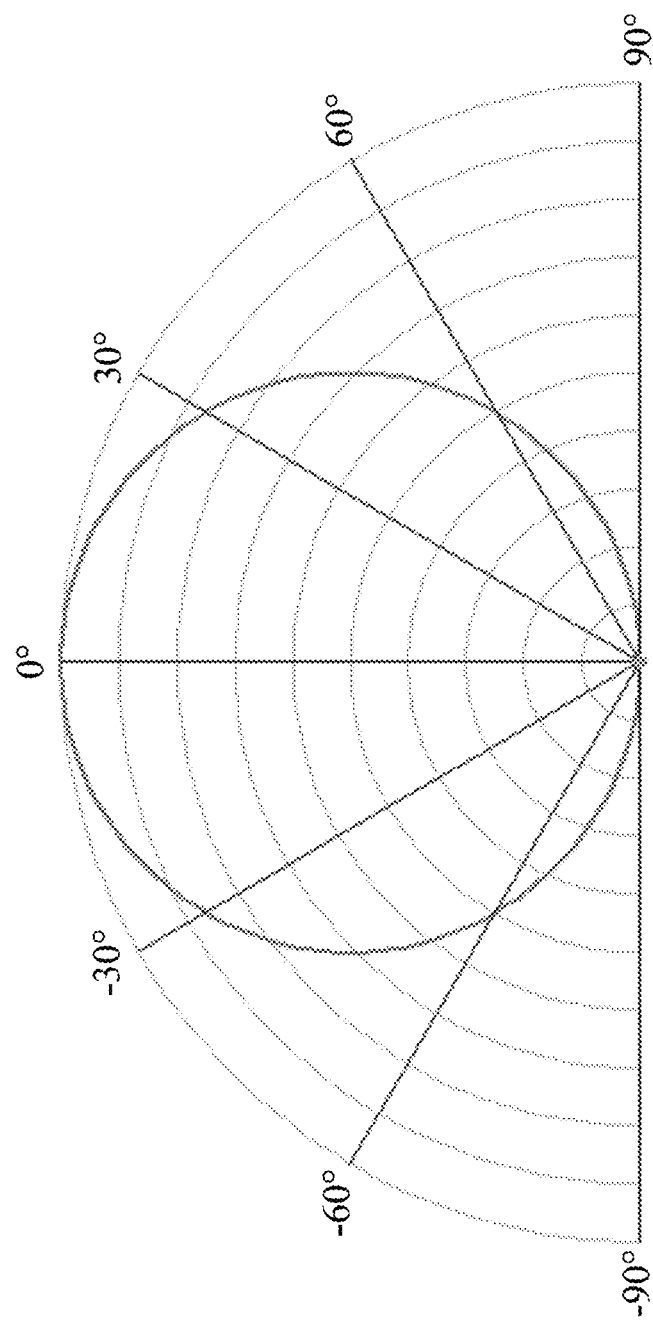
FIG. 3 shows a distribution diagram of a light field of light emitted from a light source in accordance with one embodiment of the present invention.

Simultaneously refer to FIG. 2 and FIG. 3, in which FIG. 3 shows a distribution diagram of a light field of light emitted from a light source in accordance with one embodiment of the present invention. In an embodiment, the light field generated by the emitted light of the light-emitting units 212 conforms to Lambertian distribution. Generally speaking, the light-intensity angle of the light-emitting light source 212 of Lambertian light field is between −60 degrees and 60 degrees (that is, the complementary angle θ of a half light-intensity angle of each light-emitting unit 212 is 30 degrees), and by the restriction that the θ' of the second inequality ranges from 5 degrees to 20 degrees, it can be ensured that the light having the largest light intensity in two adjacent Lambertian light fields will not be reflected excessively around the aforementioned virtual intersection A1 to produce a light concentration effect and lead to grid bright lines.

Refer to FIG. 2 again, through the light reflecting structure 220 of the present invention, the light emitted from each light-emitting unit 212 could be generally separated into a first portion of light L1 and a second portion of light L2 under the effect of the light reflecting structure 220. The first portion of light L1 emitted from the light-emitting unit 212 can pass through the location above the top portions 222b of the sidewall portions 222, and the second portion of light L2 emitted from the light-emitting unit 212 is emitted toward the sidewall portions 222, and it can be reflected by the sidewall portions 222 to emit toward the location above the light-emitting unit 212. In a specific embodiment, when the emitting angle of the first portion of light L1 at the Lambertian light field ranges from 65 degrees to 80 degrees and from −65 degrees to −80 degrees and includes the end point values, the first portion of light L1 will not be reflected by the sidewall portion 222 and can be mixed with the first portion of light L1 from the adjacent light-emitting unit 212. On the other hand, the second portion of light L2 in the light emitted from the light-emitting unit 212 is emitted toward the sidewall portions 222, and is emitted toward the location above the light-emitting units 212 after being reflected by the sidewall portions 222. That is, the light emitting angle of the second portion of light L2 is out of the range of the first portion of light L1, and is between −90 degrees and 90 degrees. Taking the light-emitting unit 212b of FIG. 2 as an example, the second portion of light L2 produced by the light-emitting unit 212b has an light-emitting angle which is greater than the light-emitting angle of the first portion of light L1 (not including the end point values) and smaller than 90 degrees.

Therefore, both the first portion of light L1 emitted from the light-emitting unit 212a and the first portion of light L1 emitted from the light-emitting unit 212b will not be reflected by the reflecting surface 222a and the reflecting surface 222c, and can directly pass through the location above the top portions 222b of the sidewall portions 222, hence the amount of the reflected light will be reduced. Therefore, comparing to the simulation diagram of light intensity of the light reflecting structure having steeple design (as shown in FIG. 1), the light reflecting structure 220 of the present disclosure can avoid the light to be excessively concentrated above the top portions 222b, and can reduce the conventional grid bright lines problem (as shown in FIG. 4).

Figure 4:
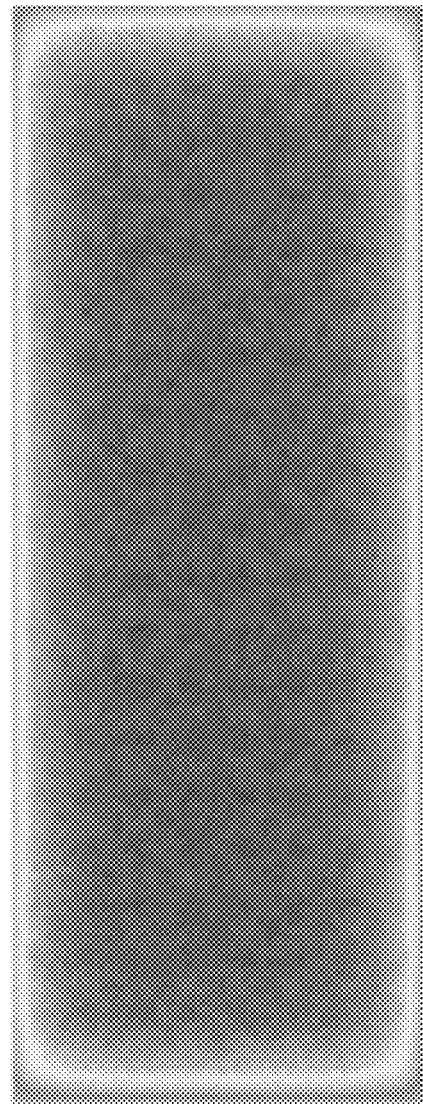
FIG. 4 shows a simulation diagram of light intensity of a backlight module in accordance with one embodiment of the present disclosure.

Refer to FIG. 1 and FIG. 4 simultaneously, FIG. 4 shows a simulation diagram of light intensity of the backlight module 200 in accordance with one embodiment of the present disclosure. Comparing to the light mixing effect of the backlight module having the conventional light source as shown in FIG. 1, the backlight module using the light reflecting structure of the present embodiment will be less possible to produce the grid bright lines, which means that the backlight module of the present disclosure has better light mixing effect. Concretely saying, the light reflecting structure of the present embodiment is designed based on the half light-intensity angles of the light reflecting structure, the height of the sidewall portions, and the distance of the light reflecting structures. Therefore, the sidewall portions of the light reflecting structure can not only reflect a portion of the light produced by the light-emitting units to emit upward, but also allow a portion of the light produced by the light-emitting units to directly pass through the location above the top portion of the sidewall portions, and further produce the light mixing effect at the location above the top portion, thereby being avoiding the formation of the grid bright lines, and increasing the light-emitting uniformity of display devices and backlight modules.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A light reflecting structure, configured to reflect light emitted from a plurality of light-emitting units, wherein the light reflection structure comprises:
    a bottom portion;
    a plurality of sidewall portions standing on the bottom portion, wherein the sidewall portions respectively and correspondingly surround the light-emitting units, and the light emitted from each light-emitting unit can be directed to a reflecting surface corresponding to each of the sidewall portions to be reflected outward;
    wherein there is a distance P between any two adjacent sidewall portions, and each of the sidewall portions has a height H1, and wherein the distance P and the height H1 satisfy a first inequality, and the first inequality is:

$$H1 < \frac{P}{2} \times \tan\theta;$$

wherein θ represents a complementary angle of a half light-intensity angle of each of the light-emitting units;
    wherein the sidewall portions are connected to each other through a plurality of junction portions, and each of the junction portions is a non-steeple structure; and
    wherein each of the light-emitting units emits a first portion of light, the first portion of light includes a light emitted at the half light-intensity angle, and the first portions of light emitted from any two adjacent light-emitting units pass through a location above the junction portion.

2. The light reflecting structure of claim 1, wherein the distance P and the height H1 satisfy a second inequality, and the second inequality is:

$$H1 < \frac{P}{2} \times \tan(\theta - \theta');$$

wherein θ ranges from 5 degrees to 20 degrees, and includes end point values.

3. The light reflecting structure of claim 2, wherein θ is 30 degrees.

4. The light reflecting structure of claim 1, wherein the sidewall portions are connected to each other through the junction portions, wherein each of the junction portions is a plane structure.

5. The light reflecting structure of claim 1, wherein the sidewall portions are connected to each other through the junction portions, wherein each of the junction portions is a cambered structure.

6. The light reflecting structure of claim 1, wherein
    the sidewall portions are connected to each other through the junction portions, and the bottom portion, the sidewall portions, and the junction portions are collectively formed an integrated structure; and
    wherein each of the junction portions is a plane structure or a cambered structure.

7. The light reflecting structure of claim 1, wherein each of the reflecting surfaces is inclined relative to its corresponding light-emitting units along a direction away from the light-emitting units.

8. The light reflecting structure of claim 7, wherein
    each of the sidewall portions has a top portion;
    any two of the reflecting surfaces of the adjacent sidewall portions are extended to form an virtual intersection;
    wherein the location of the top portion is lower than the location of the virtual intersection.

9. The light reflecting structure of claim 8, wherein
    a light field of the light emitted from each of the light-emitting units conforms to Lambertian distribution, the light emitted from each of the light-emitting units includes the first portion of light, and the first portion of light passes through the location above the top portion of the sidewall portion.

10. The light reflecting structure of claim 9, wherein the light emitted from the light-emitting units further includes a second portion of light, the second portion of light emits toward the sidewall portion, and is directed toward the location above the light-emitting unit after being reflected by the sidewall portion.

11. The light reflecting structure of claim 9, wherein an emitting angle of the first portion of light at Lambertian light field ranges from 65 degrees to 80 degrees and from −65 degrees to −80 degrees, and includes end point values.

12. A backlight module, comprising:
    a light source, comprising a substrate and a plurality of light-emitting units arranged as arrays on the substrate;
    a light reflecting structure in claim 1 disposed on the substrate; and
    at least one optical film disposed above the light source and the light reflecting structure.

13. The backlight module of claim 12, wherein there are a plurality of through holes at the bottom portion of the light reflecting structure, and the light-emitting units emit light toward the sidewall portions and at least one optical film through the through holes.

14. A display device, comprising:
    a backlight module of the claim 12; and
    a display panel disposed on the backlight module.

* * * * *